United States Patent [19]

Kitai

[11] 3,946,414

[45] Mar. 23, 1976

[54] ELECTRIC SHUTTER WITH POSITIVE MOTION DEVICE

[75] Inventor: Kiyoshi Kitai, Tokyo, Japan

[73] Assignee: Seiko Koki Kabushiki Kaisha, Japan

[22] Filed: Apr. 10, 1974

[21] Appl. No.: 459,722

[30] Foreign Application Priority Data
Apr. 11, 1973 Japan.............................. 48-42698

[52] U.S. Cl. ................. 354/258; 354/245; 354/246
[51] Int. Cl.²........................ G03B 9/40; G03B 9/62
[58] Field of Search ........ 354/50, 51, 258, 246, 245

[56] References Cited
UNITED STATES PATENTS

| | | | |
|---|---|---|---|
| 3,535,989 | 10/1970 | Kitai | 354/50 |
| 3,601,019 | 8/1971 | Kitai | 354/50 |
| 3,645,186 | 2/1972 | Kitai | 354/258 |
| 3,698,304 | 10/1972 | Tenkumo | 354/258 |
| 3,722,392 | 3/1973 | Kitai | 354/50 |

*Primary Examiner*—L. T. Hix
*Assistant Examiner*—Russell E. Adams, Jr.
*Attorney, Agent, or Firm*—Robert E. Burns; Emmanuel J. Lobato; Bruce L. Adams

[57] ABSTRACT

An electric shutter with a positive motion device that insures positive action of the shutter. The shutter has a depressable release member that is restored by a spring when pressure thereon is released so that the release member is reset when the shutter is opened. When the shutter is cocked the mechanical positive motion device is mechanically releasably locked maintaining the shutter blade or blades against biasing springs. When the release member is depressed the shutter is opened and an electromagnet of an exposure control circuit is energized and an attractable lever in the positive motion device is held attracted by the energized electromagnet releasably controlling the release of members that release the shutter blade or blades for actuation to a shutter-closing position. A mechanical locking member in conjunction with a press lever in the positive control device positively locks the attractable lever in the same position as when attracted when the shutter is cocked. Upon energization of the electromagnet the mechanical locking member is released and positive actuation of the attractable element is insured even though the release member is restored by a biasing spring thereof.

2 Claims, 4 Drawing Figures

ELECTRIC SHUTTER WITH POSITIVE MOTION DEVICE

BACKGROUND OF THE INVENTION

This invention relates generally to electric shutters and more particularly to a positive motion device in an electric shutter.

In known electric shutters when a time exposure or delayed exposure is to be taken the camera release member is actuated or depressed and released for taking an exposure. The release of the manual force applied to the release member allows it to be restored or reset to its initial position. The resetting in some known shutters will in some cases prevent closing of the shutter when a long exposure time photograph is being taken.

SUMMARY OF THE INVENTION

It is a principal object to provide a new and improved electric shutter having a positive motion device for insuring proper and positive opening and closing of the shutter.

The electric shutter according to the invention has one or two shutter blades constantly biased. An electromagnet in an exposure control circuit controls the closing of the shutter when it is deenergized upon completion of the exposure time. A positive control device in the shutter-operating mechanism comprises an attractable lever that is held in attracted position by the electromagnet when it is energized. When the shutter is cocked a locking lever of the device locks a press lever thereof in a condition in which the press lever presses the attractable lever to the electromagnet as though the electromagnet were energized. In this position the attractable lever can control closing of the shutter positively when released by the press lever and locking lever and eventually when the electromagnet is deenergized upon completion of an exposure under control of the exposure control circuit.

The shutter is opened and the exposure control circuit is closed upon actuation of a release element and this energizes the electromagnet. The press lever of the positive motion device has an arm in the path of a pin on the release lever that effect mechanical release of the attractable element which is then releasably held by the electromagnet even if the release element is released by the camera user so that the release element is restored to its initial postion of readiness for opening the shutter upon actuation thereof.

BRIEF DESCRIPTION OF THE DRAWINGS

Other objects and advantages of a shutter embodying a positive motion device according to the invention will appear from the following description of an example of the invention, and the novel features will be particularly pointed out in the appended claims.

DESCRIPTION OF THE PREFERRED EMBODIMENTS

Figure 1:
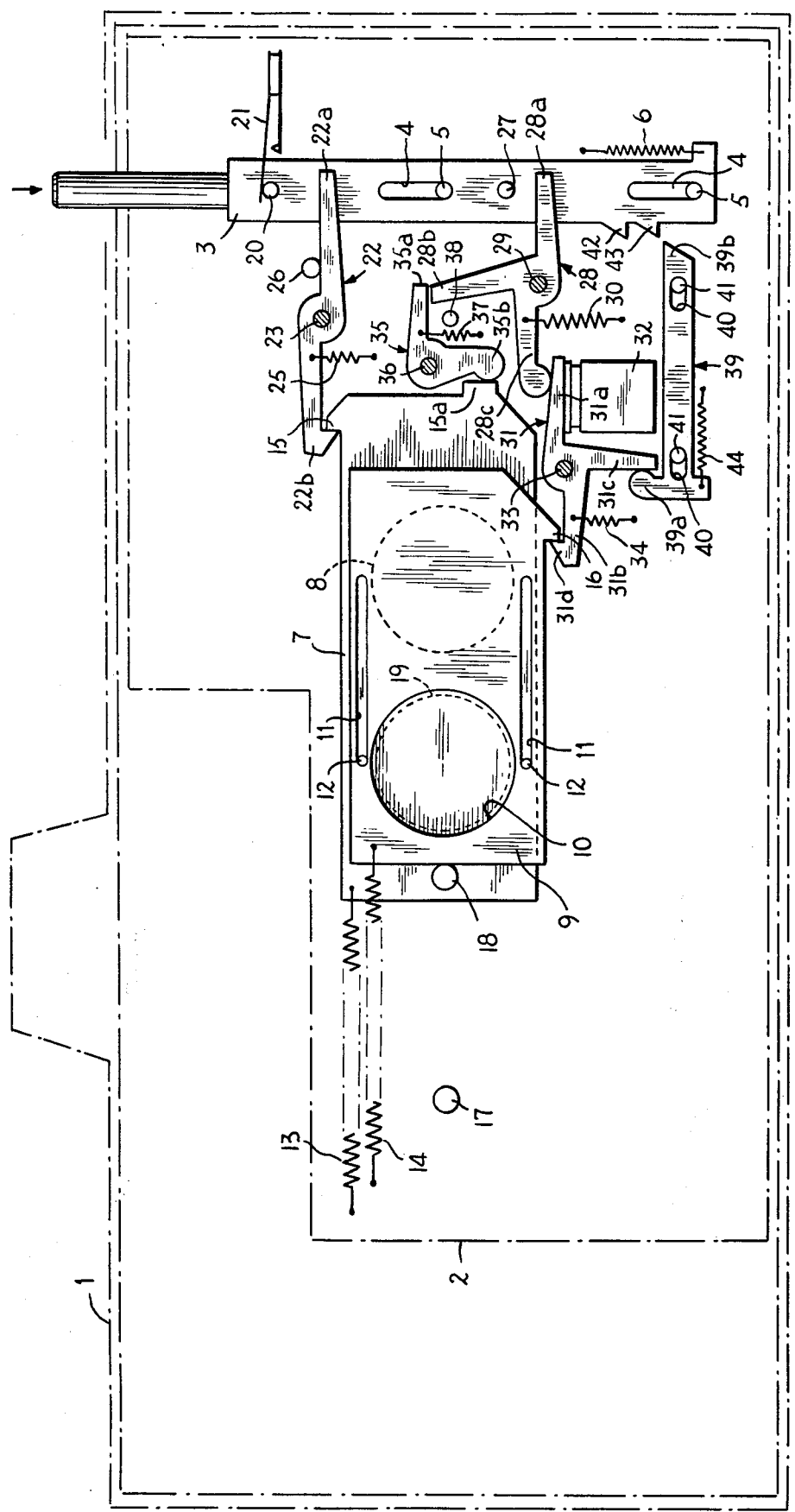
FIG. 1 is a plan view of a shutter embodying an electric shutter with a positive motion device according to the invention and illustrates the shutter in a cocked condition.

As illustrated in the drawing, a camera body 1 is provided with a shutter according to the invention. The shutter comprises a baseboard 2 on which is reciprocably mounted a camera release bar or element 3 which is provided with axially spaced elongaged slots 4 within which are slidably received guide-and-stop pins 5 fixed to the baseboard 2. The camera release bar 3 is actuatable axially by depressing it downwardly in the direction of the arrow shown for taking photographic exposures and is constantly biased to an upward position, illustrated in the drawing, by a spring 6. The upper end of the release bar 3 extends or projects outside of the camera body 1 as illustrated.

The shutter comprises a shutter front blade 7 having an opening 8 for registry with a camera exposure aperture and a shutter rear blade 9 with an aperture 10. The shutter blades are provided with elongated slots 11 within which guide pins 12 are disposed and these are fixed on the baseboard 2. The shutter blades are urged towards the left by respective biasing springs 13, 14. Both the shutter front and rear blades are provided with hooks or projections 15, 16 respectively formed at the right hand ends of the front and rear blades 7, 9. A fixed stop 17 on the baseboard controls the extent of travel of the rear blade 9 to the left and a pin or stop 18 on the front blades controls the travel of the rear blade. The rear blade stop 18 is mounted on the left front end of the front blade. The camera is provided with a lens aperture or an exposure aperture 19 which the shutter blade apertures are placed in registry for effecting an exposure.

An operating pin 20 projects from a side of the upper part of the camera release bar 3. The pin engages a movable contact of a power switch 21 of an exposure control circuit, opening the switch when the release bar is biased to its upward position as illustrated in FIG. 1. A first lock lever 22 is pivotally mounted on a pivot 23 and is biased in a counterclockwise direction by a spring 25 so that an arm 22a engages a stop pin 26 which controls the counterclockwise extent of movement of the lock lever 22. The arm 22a extends into the part of travel of the operating pin 20 on the release bar 3 as illustrated and is engaged thereby when the camera release bar 3 is depressed as later described. A second arm of the lock lever has a hook 22b which engages a projection or hook 15 of the front blade 7 holding it releasably locked against the force of its biasing spring 13.

Another operating pin 27 projects from a lower part of the camera release bar 3. A three-arm press lever 28 is pivotally mounted on a pivot 29 and is biased in a counterclockwise direction by a biasing spring 30. The press lever has a first arm 28a extending into the path of travel of the lower operating pin 27. The press lever has a second arm 28b and a third arm 28c which presses against a second lock lever 31 pivotally mounted on a pivot 33 so that the second lock lever presses against an electromagnet 32 which is electrically connected to the exposure control circuit, not shown.

The second lock lever 31 has an arm 31a which is attractable by the electromagnet 32 and is likewise a three-arm lever having an arm 31b provided with a hook 31d that engages the hook or projection 16 of the rear blade 9 and releasably locks or holds the rear blade. The other lever arm 31c is intermediate the other two arms as illustrated. The second lock lever is biased in a counterclockwise direction by a biasing spring 34 and is, therefore, biased in a direction to unfasten the hook thereon from the hook on the rear blade 9 for releasing the rear blade.

A third lock lever 35 is pivotally mounted on a pivot 36 and is biased in a clockwise direction by a biasing spring 37 that biases locking arm 35a in a direction for lying in the path of the lever arm 28b of the press lever. A second arm 35b of this third lock lever is engaged with a projection 15a of the front blade 7 when the shutter is in a cocked condition as illustrated in FIG. 1 so that the biasing force of the biasing spring 37 is counteracted. A stop pin 38 stops the rotation of the third lock lever.

A stop bar 39 which can preclude the depressing of the camera release bar 3 is slidably supported for movement in the horizontal direction and is provided with elongated slots 40 within which pins 41 fixed on the baseboard are received for guiding the axial movement thereof. The stop bar has on the left end thereof an arm 39a which is releasably engaged by the intermediate arm 31c of the press lever 31 and has on its right end a lock claw 39b that cooperates with a saw-tooth claw 42 on the camera release element or bar 3 to render inoperative the release bar 3 when the electromagnet 31a is not properly energized. A second saw-tooth claw 43 is provided on the camera release bar 3 which makes impossible taking an exposure when the shutter is not charged.

The vertical distance between the stop bar claw 39b and the upper claw 42 on the camera release bar 3 is somewhat less than the vertical distance between the upper operating pin 20 of the release bar and the arm 22a of the lock lever 22. On the other hand, this vertical distance between this stop bar claw 39b and the lower claw on the release bar is greater than the vertical distance between the lower operating pin 27 and the press lever arm 28a. The vertical distance between the stop bar claw 39b and the lower claw 43 on the release element or bar is somewhat smaller than the travel distance required for the operating pin 20 to open and close the power switch 21. The stop bar 39 is constantly or continuously urged to the right by a biasing spring 44.

When the electromagnet 32 is excited or energized or the second lock lever 31 is pressed by the press lever into contact with the electromagnet the stop lever 31 has its arm 31c in position blocking the movement of the stop bar 39 toward the right so that it cannot interengage its claw with the saw-tooth claws of the release bar 3. However, when the electromagnet is deenergized, the biasing spring 44 will bias the stop bar toward the right so it is in the path of the claws of the stop bar and the latter cannot be depressed.

OPERATION

Figure 3:
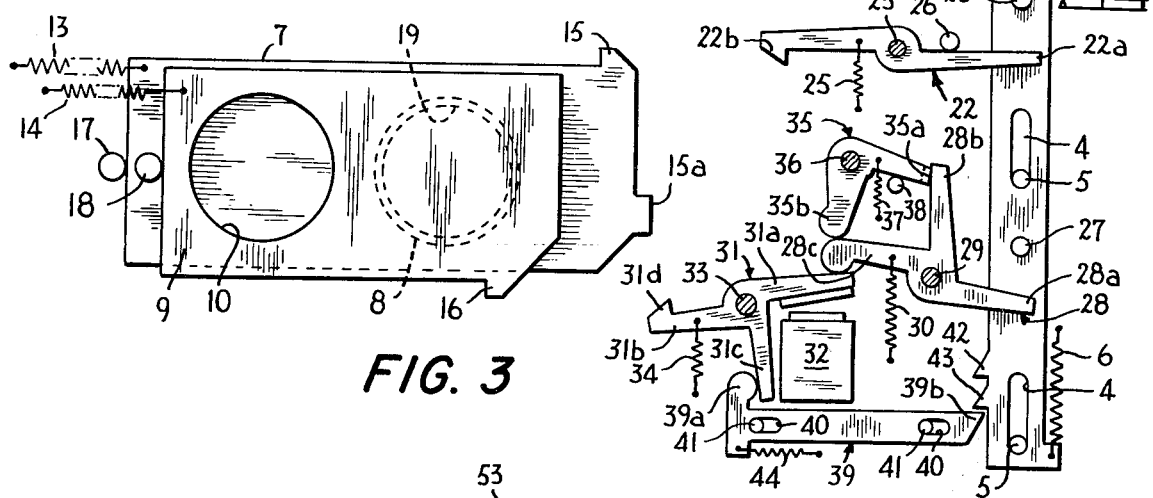
FIG. 3 is a fragmentary plan view of the shutter in FIG. 2 illustrated after closing of the shutter.

After an exposure has taken place in a normal condition the stop bar 39, as shown in FIG. 3, is moved toward the right by the biasing spring 44 and places its claw 39b in the position where its claw is engageable with the lower claw 43 of the release bar 3. When the release bar 3 is depressed in this condition, the claws engage before the power switch 21 is closed and the release bar 3 is prevented from being pushed down completely. Therefore, the operation of the shutter becomes impossible and this warns the user that the shutter has not been charged or cocked after an exposure. This prevents the waste of film and the consumption of power.

Figure 2:
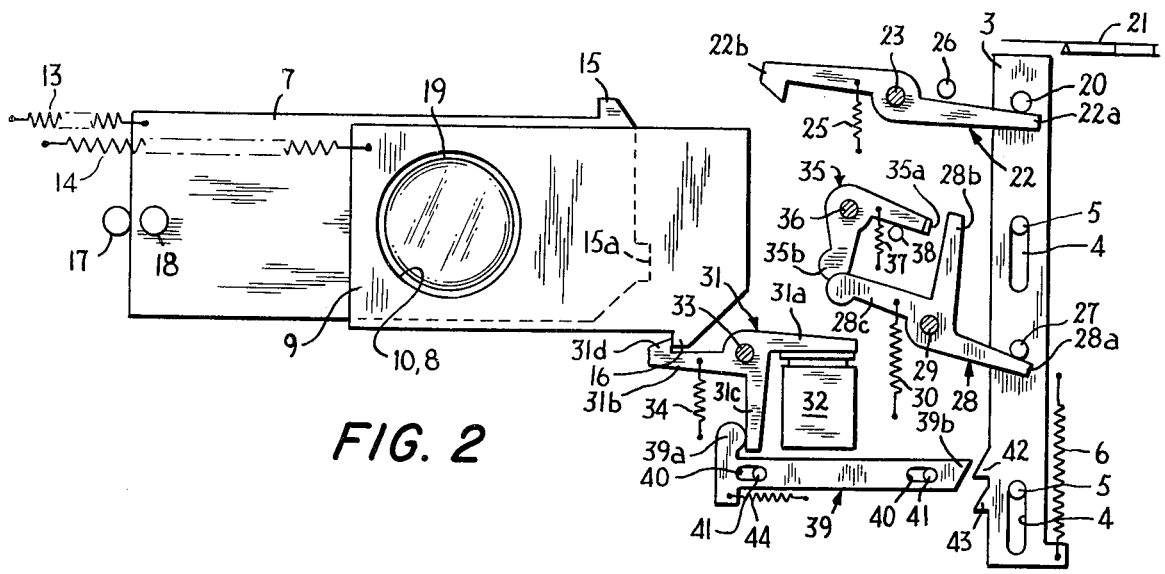
FIG. 2 is a fragmentary plan view of the shutter in FIG. 1 illustrated in an opened condition.

In the condition illustrated in FIG. 1, the shutter is charged or cocked. When the release bar 3 is depressed, the power switch 21 is closed to start operation of the exposure time control circuit, not shown, and the attractable arm 31a of the lock lever 31 is attracted by the exciting of the electromagnet 32. The lower operating pin 27 on the release bar pushes the arm 28a of the press lever to actuate the press lever in a clockwise direction and thereby release the arm 31a from being pressed by the press arm 28c. The upper operating pin 20 on the release bar 3 engages an arm 22a of the first lock lever 22 and biases it in a direction to cause its hook 22b to release the hook 15 on the front shutter blade. The front blade 7 moves toward the left bringing its exposure aperture 8 in registry with the exposure aperture 19 to open the shutter as shown in FIG. 2. The electromagnet 32 is deenergized when the exposure is to be terminated under control of the exposure control circuit. When the electromagnet is deenergized, the exposure time lock lever rotates in a counterclockwise direction under control of its biasing spring 34 so that it unhooks its hook 31b from its hook 16 on the back blade so that the rear blade 9 moves to the left under the control of its biasing spring 14. Thus, the condition, illustrated in FIG. 3, is established and the shutter is closed. The counterclockwise movement of the third lock lever 31 releases the stop lever or bar 39 so that it moves towards the right under control of its spring 44 but since the upper claw 42 has already passed clear of the claw 39b of the stop bar, the release bar 3 is not stopped.

In the event that the power source of the exposure control circuit is forgotten to be put in or the battery has been consumed or is placed with its polarity improperly disposed the electromagnet 32 is not excited or energized even if the power switch is closed in FIG. 1 when the shutter is operated. In this condition the shutter is charged and the lower operating pin 27 actuates the press lever 28 in a clockwise direction to release the third lock lever arm 31a from being pressed by its press arm 28c. The third lock lever 31 is free to rotate in a counterclockwise direction to allow the stop lever 39 to move toward the right and place its stop claw in the path of the upper saw-tooth claw of the camera release bar 3 to preclude any further downward movement thereof to preclude effecting an exposure. The hook 31d of the third lock lever releases the rear blade but it is prevented from moving toward the left by the stop pin 18 on the front blade.

SECOND EMBODIMENT

Figure 4:
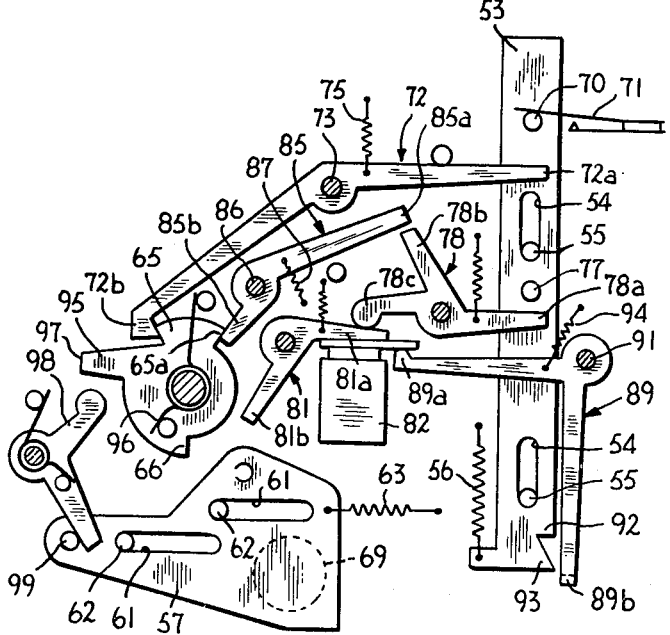
FIG. 4 is a plan view of a second embodiment of a shutter and positive motion device according to the invention.

A second embodiment of a shutter embodying the invention is illustrated in FIG. 4. In this embodiment the elements corresponding to those of the first embodiment have reference numerals increased by an addition of 50. Thus a camera release bar 53 is actuatable axially and is provided with elongated slots 54 within which fixed guide-and-stop pins 55 are disposed. The release bar is biased upwardly by a spring 56.

A single shutter blade 57 is provided and has two elongated slots 61 in which are received fixed guide pins 62. The shutter blade has no aperture therein and is biased to the right by a biasing spring 63. An operating pin 70 is disposed on the upper part of the release bar 53 for opening and closing a power switch 71 of an exposure control circuit as before described.

A first lock lever 72 is pivotally mounted on a pivot 73 and has an arm 72a in the path of the operating pin 70. The lock lever has a hook 72b. A lower operating pin 77 is provided on the camera release lever for actuating a press lever 78 having a first arm 78a in the path of the operating pin, an intermediate arm 78b and a third or press arm 78c pressing a stop lever 81 having an attractable arm 81a, which has an attractable element thereon, as in the first embodiment, pressed against an electromagnet 82.

A second stop lever 85 is pivotally mounted on a pivot 86 and has an arm 85a in the path of the intermediate arm 78b of the press lever. The second arm is biased by a spring 87 and functions as a stop as later described. A third stop lever 89 corresponds to the stop bar 39 of the first embodiment. It is pivotally mounted on a pivot of a baseboard, not shown and has an arm 89a cooperating with the lock or stop lever 81 which hold it against clockwise rotation by a biasing spring 94. A second arm on the third lock lever has a tab or projection 89b normal to the plane of the drawing for engaging either of two saw-tooth claws 92, 93 on the camera release bar in the event the shutter is not cocked, the electromagnet is not energized or the battery is not in circuit or improperly connected. Engagement of the stop release tab 89b with the camera release bar stop claws 92, 93 will preclude complete depression thereof as in the first embodiment.

A shutter blade driving rotary element 95 is biased in a counterclockwise direction by a spring 96 and has a projecting sector 65 hooked by the hook 72b of the first lock lever releasably holding it until the camera release lever 53 is depressed. An edge 65a of the sector is engaged by an arm 85b of the lock lever 85 which is thereby held against its biasing spring 87 which biases it clockwise. The rotary shutter blade operating member 95 has a projection 97 that engages a pivotally mounted intermediate interlocking lever 98 that engages a pin 99 on the shutter blade 57.

When the shutter release lever 53 is depressed for taking a photographic exposure the power switch 71 is closed by the operating pin 70 and the lock lever 72 is actuated to release the rotary driving member 95 which rotates counterclockwise and its projection 97 engages the intermediate lever 98 and rotates it clockwise so that the shutter blade is actuated to the left for effecting an exposure. The cam edge 66 on the driving element locks the lock lever 81 since the lower operating pin on the camera release lever 53 actuates the press lever 78 to make it possible for the lever 81 to be released when the electromagnet releases it to terminate the exposure. As before described the lock lever 89 functions to preclude the taking of an exposure in the manner of the stop bar 39.

Those skilled in the art will understand that when the brightness of a field to be photographed is too high or too low circuitry may be provided for warning the user of the camera. In this case the camera release stop device can be constructed to make release impossible by connecting the warning circuit with the electromagnet 32 or 82 by interlocking it with the camera release lever 3, 53 and by deenergizing the electromagnet when the brightness conditions are outside of the range of the camera shutter.

Furthermore, those skilled in the art will understand that cocking mechanism, not shown, is provided for establishing the condition shown in FIG. 1 after closing of the shutter in the condition shown in FIG. 3.

What I claim and desire to secure by Letters Patent:

1. In an electric shutter having an exposure aperture, an electromagnet electrically energizable; at least one shutter blade operable to a shutter-opening position for opening the aperture for taking an exposure and a shutter-closing position closing the exposure aperture; and a release element for initiating the energization of said electromagnet and the taking of an exposure; shutter-operating means activated by the release element for actuating said shutter blade to said shutter-opening position and shutter-closing position; said shutter-operating means comprising an attractable lever attracted by said electromagnet when energized and having means cooperative with said shutter blade for maintaining said shutter blade in said shutter-opening position; means biasing said attractable lever away from said electromagnet; a pivotally mounted press lever; a pivotally mounted locking lever; means biasing said press lever into engagement with said attractable lever for pressing said attractable lever against said electromagnet when the shutter is in a cocked condition; means biasing said locking lever to a position for releasably locking said press lever when pressing on said attractable lever; means on said press lever in the path of travel of said release element for actuating said press lever under control of said release element to a position releasing said attractable lever upon initiation of taking of an exposure by said release element after energization of said electromagnet is initiated; means cooperative with said shutter blade maintaining said locking lever in an unlocking condition releasing said press lever when the shutter is cocked and in readiness for positioning in a locking position for locking said press lever under control of said biasing means thereof when an exposure is initiated; said means cooperative with said shutter blade comprising means restoring said locking lever to said unlocking position when said shutter is cocked, and means cooperative with said release element for initiating taking of an exposure.

2. In an electric shutter according to claim 1, bar lever means releasably locked by said attractable lever when said attractable lever is pressed against said electromagnet and when attracted by said electromagnet and operable for engaging said release element and precluding actuation thereof when said attractable lever is unattracted by said electromagnet and when the shutter is in an uncocked condition, and means biasing the bar lever means in a direction for engaging said release element.

* * * * *